United States Patent [19]
Okauchi

[11] Patent Number: 5,907,353
[45] Date of Patent: May 25, 1999

[54] DETERMINING A DIVIDING NUMBER OF AREAS INTO WHICH AN OBJECT IMAGE IS TO BE DIVIDED BASED ON INFORMATION ASSOCIATED WITH THE OBJECT

[75] Inventor: Shigeki Okauchi, Kodaira, Japan

[73] Assignee: Canon Kabushiki Kaisha, Tokyo, Japan

[21] Appl. No.: 08/621,789

[22] Filed: Mar. 28, 1996

[30] Foreign Application Priority Data

Mar. 28, 1995 [JP] Japan .................................... 7-069320

[51] Int. Cl.⁶ .................................................. H04N 5/225
[52] U.S. Cl. ........................................................... 348/218
[58] Field of Search .................................... 348/218, 219; 382/284; 396/335; H04N 5/225

[56] References Cited

U.S. PATENT DOCUMENTS

| | | | |
|---|---|---|---|
| 4,383,170 | 5/1983 | Takagi et al. | 348/218 |
| 4,633,317 | 12/1986 | Uwira et al. | 348/219 |
| 4,797,942 | 1/1989 | Burt | 348/218 |
| 5,264,940 | 11/1993 | Komiya et al. | 348/298 |
| 5,377,330 | 12/1994 | Kubota et al. | 382/284 |
| 5,402,171 | 3/1995 | Tagami et al. | 348/219 |

FOREIGN PATENT DOCUMENTS

| | | | |
|---|---|---|---|
| 06078189 | 3/1994 | Japan | H04N 5/225 |
| 6-141228 | 5/1994 | Japan . | |
| 08214197 | 8/1996 | Japan | H04N 5/225 |

*Primary Examiner*—Tuan V. Ho
*Attorney, Agent, or Firm*—Fitzpatrick, Cella, Harper & Scinto

[57] ABSTRACT

An image pickup apparatus comprises image pickup means for converting an object image formed on an image pickup surface to an image signal and object information detection means for detecting information associated with the object. Control means for determines a dividing number of areas into which the object image to be picked up by the image pickup means is to be divided on the basis of the information from the object information detection means and controls the image pickup means to perform the image pickup operation of the object image by executing image pickup operations a number of times, the number of times being equal to the dividing number. Preferably, the information detection means detects at least one of a size and a density of the object.

21 Claims, 3 Drawing Sheets

DETERMINING A DIVIDING NUMBER OF AREAS INTO WHICH AN OBJECT IMAGE IS TO BE DIVIDED BASED ON INFORMATION ASSOCIATED WITH THE OBJECT

BACKGROUND OF THE INVENTION

1. Field of the Invention

The present invention relates to an image pickup apparatus such as an electronic camera for recording a digital still image.

2. Related Background Art

In recent years, with the advent of high-performance personal computers and high-resolution monitors, a demand has arisen for an apparatus that can input and store images such as a document, a color drawing, a photograph, and the like as digital still images with a high resolution For this purpose, an image pickup apparatus such as an electronic still camera or the like is used.

However, the image quality of the electronic camera depends on the number of pixels of an image pickup element such as a CCD image sensor built therein In general, a high-quality image can be picked up at the telephoto side but cannot be picked up at the wide-angle side In order to obtain a high-quality image, a means for increasing the number of pixels of the image pickup element and a means for divisionally picking up a single image in the vertical and horizontal directions by changing the image pickup range upon rotation of a mirror, and synthesizing a plurality of picked-up images using image correlation to obtain a single image (image division method; Japanese Laid-Open Patent Application No. 6-141228) have been proposed However, according to the former means, since the cost of the image pickup element rises, the apparatus becomes expensive as a whole. Also, according to the latter means, when the size or density of an object changes, the number of divisions in the image pickup operations cannot be changed accordingly. For this reason, the image quality varies considerably depending on the size or density of the object.

SUMMARY OF THE INVENTION

It is, therefore, an object of the present invention to provide an image pickup apparatus which can pick up a high-quality still image corresponding to information associated with an object such as the size, density, or the like, of the object, using an inexpensive image pickup element with a smaller number of pixels.

In order to achieve the above object, an image pickup apparatus according to one aspect of the present invention comprises image pickup means, having an image pickup element and an imaging lens for imaging light rays from an object on an image pickup surface of the image pickup element, for extracting and inputting at least one image from the object, object information detection means for detecting information associated with the object, and image extraction number determination means for determining the number of images of the object to be picked up by the image pickup means on the basis of the information from the object information detection means.

In one embodiment of the present invention, the object information detection means detects at least one of a size and a density of the object.

In another embodiment of the present invention, the object information detection means detects the size of the object on the basis of a distance to the object and a focal length of the imaging lens.

In still another embodiment of the present invention, the object information detection means detects the density of the object on the basis of an image pickup signal output from the image pickup element.

In still another embodiment of the present invention, the imaging lens has a zoom lens, and the object information detection means detects a focal length of the zoom lens in an in-focus state.

In still another embodiment of the present invention, the image pickup means can extract and input a plurality of images from the object by dividing an image of the object in arbitrary, one direction and at least one direction perpendicular to the one direction.

In still another embodiment of the present invention, the image of the object is divided so that each of divided areas partially overlaps neighboring areas.

In still another embodiment of the present invention, the image pickup means can extract and input a plurality of images from the object by shifting an optical axis of light rays from the object in units of a small number of pixels in arbitrary, one direction and at least one direction perpendicular to the one direction.

According to the image pickup apparatus of one embodiment of the present invention, since the number of images to be extracted from the object image can be determined on the basis of the information associated with the object, a stable high-quality image can be obtained in correspondence with the object.

According to the image pickup apparatus of one embodiment of the present invention, even when the size or density of the object varies, a stable high-quality image can always be obtained.

According to the image pickup apparatus of one embodiment of the present invention, the density of the object can be easily obtained using the image pickup signal from the image pickup element.

According to the image pickup apparatus of one embodiment of the present invention, since the number of images to be extracted from the object image can be determined in correspondence with the zoom ratio by detecting the focal length of the zoom lens in the in-focus state, a stable high-quality image can be obtained by extracting a larger number of images at a high zoom ratio.

According to the image pickup apparatus of one embodiment of the present invention, an image pickup operation based on the image division method can be performed.

According to the image pickup apparatus of one embodiment of the present invention, an original object image can be obtained by synthesis on the basis of image correlation among areas divided in the image division method.

According to the image pickup apparatus of one embodiment of the present invention, an image pickup operation based on a pixel shift method can be performed.

DETAILED DESCRIPTION OF THE PREFERRED EMBODIMENTS

Figure 1:
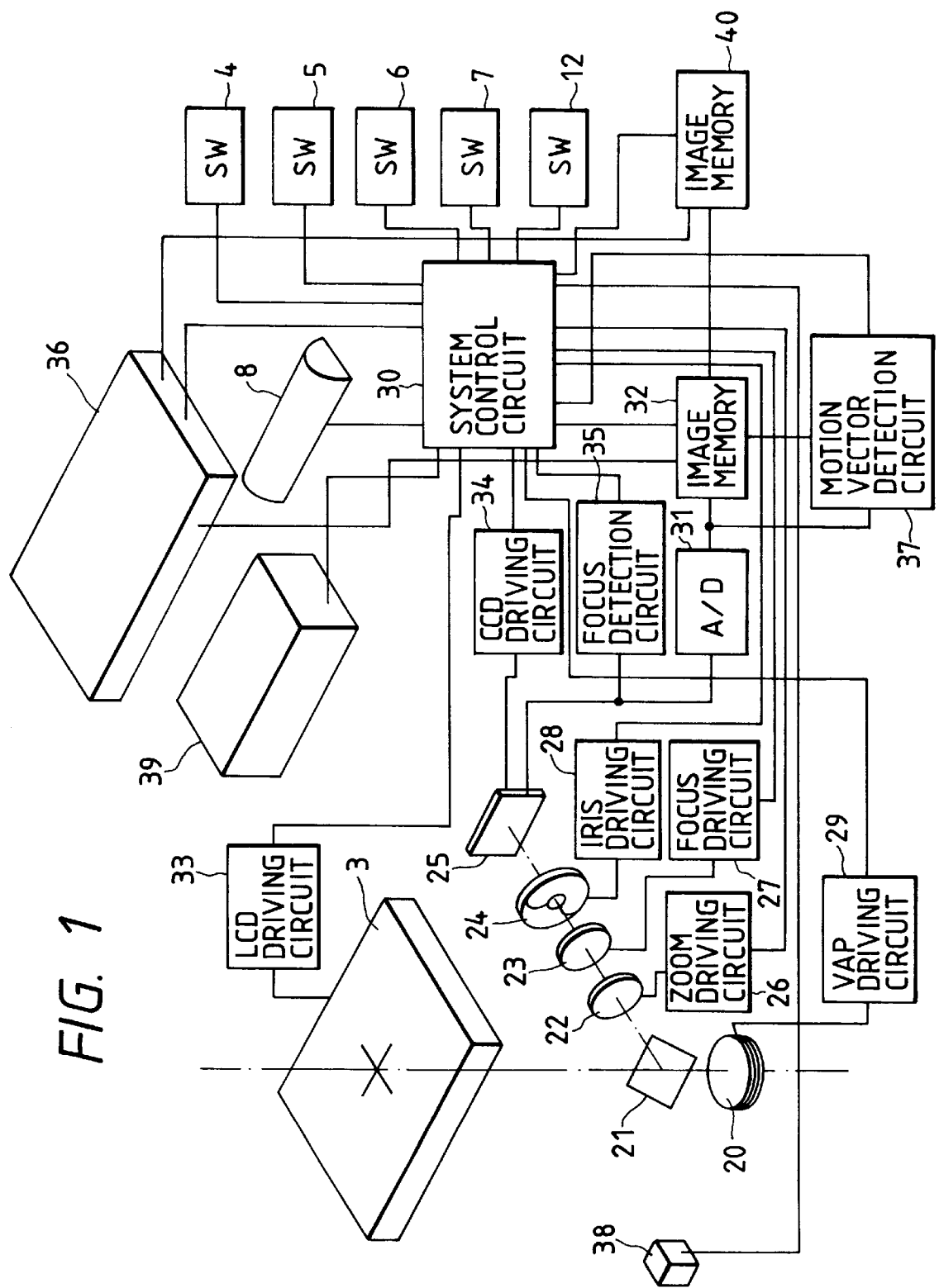
FIG. 1 is a schematic block diagram showing the arrangement of an electronic camera according to the first embodiment of the present invention.

The preferred embodiments of the present invention will be described hereinafter with reference to the accompanying drawings The first embodiment of the present invention will be described below. FIG. 1 is a block diagram of an electronic camera as an image pickup apparatus according to the first embodiment of the present invention FIGS. 2A and 2B are perspective views showing the outer appearances on the upper and lower surface sides of the electronic camera.

Figure 2:
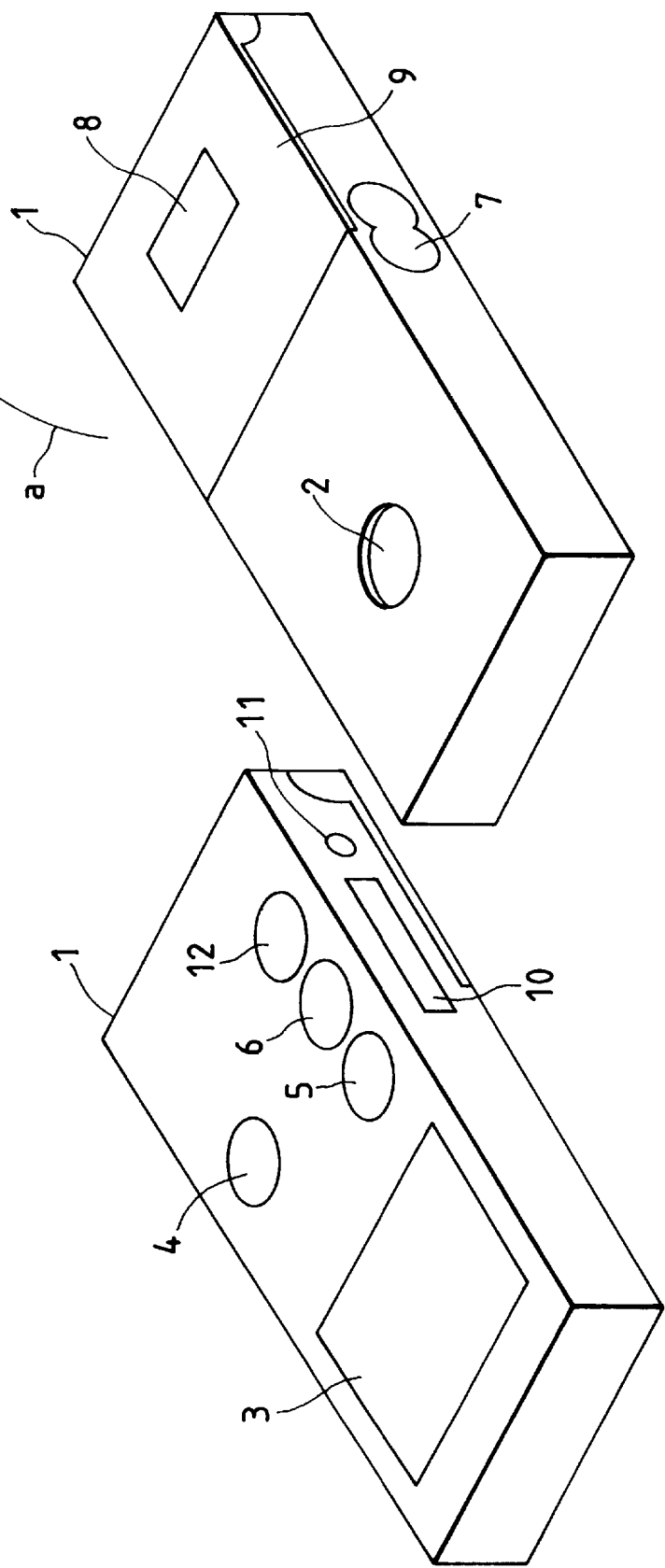
FIGS. 2A and 2B are perspective views showing the outer appearance of the electronic camera according to the first embodiment of the present invention.
Figure 3:
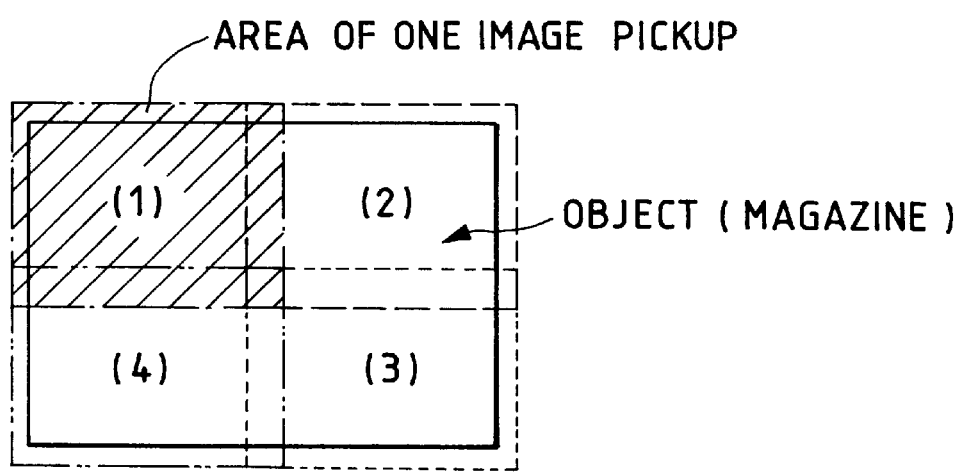
FIG. 3 is a view for explaining the image division method in the first embodiment of the present invention.

Referring to FIGS. 2A and 2B, an electronic camera main body 1 has roughly a rectangular parallelopiped shape, and an image pickup optical system is arranged inside an image pickup opening portion 2. A display unit 3 comprises, e.g, a liquid crystal display device (LCD) for displaying a picked-up image. A release button 4 is used for starting the release operation of the camera A mode selection switch 5 is used by a photographer to select one of two modes, i.e., a "normal mode" and a "high-image quality mode", as will be described later. A switch 6 is used for selecting one of four states, i.e., "power OFF", "recording", "reproduction", and "erase" states. A zoom switch 7 is used for changing the zoom ratio. An electronic flash device 8 instantaneously emits flash light. A reflection plate 9 is supported at one end portion of the electronic camera main body 1 to be pivotal in the direction of an arrow a in FIG. 2B, and has a central opening portion having a shape corresponding to that of the electronic flash device 8. When this reflection plate 9 is opened, a "macro mode" (to be described later) is enabled. The surface, facing the electronic flash device 8, of the reflection plate 9 comprises a diffusion surface, and can be fixed at a plurality of opening angle positions by a click mechanism. A card slot 10 receives a memory card as a recording medium of the camera. An eject button 11 is used for ejecting the memory card. An UP/DOWN button 12 is used for displaying images in turn in the reproduction mode Referring to FIG. 1, a variable angle prism (VAP) 20 can bend the optical axis by changing a relative angle defined by two parallel plates between which silicone oil is filled. A total reflection mirror 21 reflects light rays coming from the VAP 20 upon deflecting their path through roughly right angles. The focal length of a zoom lens 22 can be continuously changed. A focus lens 23 is used for performing a focusing operation. An iris 24 is used for controlling the light amount depending on its opening degree. In the electronic camera of this embodiment, the VAP 20, the total reflection mirror 21, the zoom lens 22, the focus lens 23, and the iris 24 constitute an image pickup optical system.

A CCD image sensor 25 comprises an image pickup element for converting light rays from an object into an electrical signal. A zoom driving circuit 26 drives the zoom lens 22 in a zooming operation. A focus driving circuit 27 drives the focus lens 23 in a focusing operation. An iris driving circuit 28 adjusts the opening degree of the iris 24 in an exposure control operation. A VAP driving circuit 29 drives the VAP 20. The zoom driving circuit 26, the focus driving circuit 27, the iris driving circuit 28, and the VAP driving circuit 29 are respectively controlled by a system control circuit 30 which controls the operation of the electronic camera of this embodiment In the electronic camera of this embodiment, the CCD image sensor 25 serving as the image pickup element, and the zoom lens 22 and the focus lens 23, which serve as a photographing lens, constitute an image pickup means.

An A/D converter 31 converts an analog signal supplied from the CCD image sensor 25 into a digital signal. An image memory 32 stores a digital image pickup signal supplied from the A/D converter 31. An LCD driving circuit 33 drives the display unit 3. A CCD driving circuit 34 drives the CCD image sensor 25. A focus detection circuit 35 detects signal amplitude by extracting high-frequency components from a luminance signal obtained by processing an image pickup signal output from the CCD image sensor 25, and outputs a focus evaluation value of the focus lens 23 on the basis of the detection result A memory card 36 serves as a recording medium of the camera. A motion vector detection circuit 37 detects the motion vector of an image by comparing image data stored in the image memory 32 with that in the next frame. A mercury switch 38 detects the posture of the electronic camera main body 1 when the image pickup mode is the "high-image quality mode". A battery 39 supplies electric power to the respective elements of the electronic camera. An image memory 40 stores the digital image pickup signal stored in the image memory 32. In the electronic camera of this embodiment, the zoom driving circuit 26, the focus driving circuit 27, and the system control circuit 30 constitute an object information detection means, and the system control circuit 30 constitutes an image extraction number determination means.

The operation of the electronic camera of this embodiment will be described below.

In the electronic camera of this embodiment, the photographer can select one of the "normal mode" and "high-image quality mode" using the mode selection switch 5, as described above. The normal mode is a normal photographing mode, and the high-image quality mode is a photographing mode for obtaining an image with higher image quality than that obtained in the normal mode by extracting one or a plurality of images from an object image and synthesizing the extracted images.

The operation in the normal mode will be explained below. The photographer selects the recording state using the switch 6, and selects the normal mode using the switch 5. With this operation, letters "normal" are displayed on the lowermost portion of the display unit 3 to be superimposed on the image signal Then, the photographer selects a desired zoom ratio using the zoom switch 7. In the normal mode, light rays are incident from a direction substantially perpendicular to the camera main body 1 via the image pickup opening portion 2 located on the lower surface of the camera main body 1, and are transmitted through the VAP 20. Thereafter, the light rays are reflected, i.e., deflected through substantially right angles, by the total reflection mirror 21, and are guided to the CCD image sensor 25 via the zoom lens 22, the focus lens 23, and the iris 24, thus forming an object image on the image pickup surface of the CCD image sensor 25. The image pickup signal output from the CCD image sensor 25 is converted into a digital signal by the A/D converter 31, and the digital image pickup signal is stored in the image memory 32. A motion vector is calculated by the motion vector detection circuit 37 on the basis of the image data stored in the image memory 32 and that in the next frame, and is supplied to the system control circuit 30. The motion vector is used in camera shake prevention The image data stored in the image memory 32 is input to the system control circuit 30. The system control circuit 30 controls the LCD driving circuit 33 on the basis of the input image data signal to display a picked-up image on the display unit 3. In the electronic camera of this embodiment, the display unit 3 is arranged, so that its center roughly agrees with the optical axis of the VAP 20.

The image pickup signal output from the CCD image sensor 25 is also supplied to the focus detection circuit 35. The focus detection circuit 35 detects signal amplitude by extracting only high-frequency components (e.g., the center frequency of 1 MHz) by filtering a luminance signal, obtained by processing the image pickup signal, through a bandpass filter (BPF). The detection output is converted into a digital value, and values, corresponding to predetermined focus areas, of the digital detection value are integrated in units of fields to obtain a focus evaluation value. The focus evaluation value is input to the system control circuit 30. The system control circuit 30 controls the focus lens 23 via the focus driving circuit 27 in a direction to increase the focus evaluation value, thus setting the focus lens 23 in an in-focus state.

The photographer observes an image displayed on the display unit 3, and depresses the release button 4 when a desired image is displayed. With this operation, a still image at the instance of depression of the release button 4 is recorded in the memory card 36. When the ambient light amount of an object to be picked up is insufficient, the electronic flash device 8 is controlled to emit light so as to obtain a proper exposure amount on the CCD image sensor 25. At this time, the brightness of the object is detected on the basis of the luminance signal level of the image pickup signal output from the CCD image sensor 25, and the electronic flash device 8 is controlled on the basis of the detection output. Light emitted by the electronic flash device 8 is radiated from the opening of the reflection plate 9, and reaches the object.

When a macro-photographing operation is performed in the normal mode, the reflection plate 9 which also serves as the cover of the battery 39 is opened, and is fixed at a predetermined angle by the click mechanism With this operation, a macro-photographing detection switch (not shown) is turned on to move the zoom lens 22 to a macro position, and a focusing operation is performed. When the photographer depresses the release button 4 at that time, an object image irradiated with direct light from the electronic flash device 8 and indirect light via the diffusion surface is recorded. Note that the irradiation state of the indirect light can be confirmed by setting the switch 6 at the reproduction/erase position and selecting an image to be displayed on the display unit 3 using the button 12 after the photographing operation. When the photographer is not satisfied with the picked-up image, he or she can take a plurality of images by changing the fixing angle of the reflection plate 9. Note that an unnecessary image can be erased by displaying it on the display unit 3 while the switch 6 is set at the erase position, and depressing the release button 4.

The operation in the high-image quality mode will be described below while placing emphasis on differences from the normal mode. The photographer selects the recording state using the switch 6, and selects the high-image quality mode using the switch 5. With this operation, letters "high image quality" are displayed on the lowermost portion of the display unit 3 to be superimposed on the image signal. In the high-image quality mode, the focus evaluation value is obtained by the focus detection circuit 35 in the same process as that in the normal mode described above, and the focus lens 23 is set in an in-focus state. Based on the position of the focus lens 23 in the in-focus state, the distance (object distance) from the electronic camera (focus lens 23) to the object is calculated. Furthermore, whether the electronic camera main body 1 is roughly set in the horizontal state, i.e., a state wherein the opening portion 2 faces down, is detected using the mercury switch 38. As a result of detection, if it is detected that the camera main body 1 is roughly set in the horizontal state, the camera is set in a "divisional image pickup mode" for performing a divisional image pickup operation of still images corresponding in number to the size of an object.

In the divisional image pickup mode, when the object has a size as large as, e.g., a magazine (280 mm (length)×220 mm (width)), and when the photographer performs framing, so that the object image is displayed on the entire screen of the display unit 3 and then depresses the release button 4, the system control circuit 30 detects based on the already calculated object distance and the synthesized focal length of the zoom lens 22 and the focus lens 23 that the size of the object is as large as a magazine (this operation will be described in detail later), and determines based on this detection result that an image pickup operation is going to be performed by dividing an object image into four areas. Then, in the state wherein the entire object image is displayed, the opening degree of the iris 24 is controlled to determine the exposure amount. Subsequently, the zoom lens 22 and the focus lens 23 are controlled to pick up one of four-divided images obtained by roughly dividing the object image into two areas in both the vertical and horizontal directions, and the VAP 20 is controlled to bend the optical axis of light rays which are imaged on the image pickup surface of the CCD image sensor 25. In this state, upper left area (1) of the four-divided images is displayed on the entire screen of the display unit 3, and its image is picked up. The image pickup signal is stored in the image memory 40. At this time, to attain correlation among the four divided images, area (1) is selected on the slightly wider-angle side than those obtained by actually dividing the object image into four areas, so that area (1) partially overlaps upper right, lower right, and lower left areas (2), (3), and (4).

Thereafter, the optical axis is bent by driving the VAP 20, and an image pickup operation of upper right area (2) is performed Then, the obtained image pickup signal is stored in the image memory 32. Furthermore, the motion vector detection circuit 37 detects a motion vector on the basis of the correlation between image data of area (2) stored in the image memory 32 and image data obtained by the image pickup operation of area (1) and stored in the image memory 40. The address of the connection portion between areas (1) and (2) as additional information of the image data of area (1) is recorded in the memory card 36 together with the image data of area (1) and information indicating that the corresponding data is one of four-divided image data Thereafter, the image data of area (2) is stored in the image memory 40. Furthermore, image pickup operations of areas (3) and (4) are performed in the same procedures as described above.

When the photographer observes the four-divided images picked up by the above-mentioned operations on the display unit 3, he or she sets the switch 6 at the reproduction position, and selects a desired one to be reproduced of the four-divided images using the UP/DOWN button 12. When the photographer depresses the release button 4 while one of the four-divided images is reproduced, the four-divided images are synthesized to a single original image on the basis of the additional information recorded together with the image data, and the synthesized image is displayed on the display unit 3 while the additional information is subtracted therefrom. When the photographer wants to observe the synthesized image displayed on the display unit 3 on a monitor with higher image quality, i.e., a larger number of pixels, he or she connects the memory card 36 to a personal computer, and displays the image on the monitor.

When the size of an object is as large as that of a poster (720 mm (length)×510 mm (width)), the system control circuit 30 determines based on the detection result indicating that the size of the object is as large as that of a poster that image pickup operations are performed while dividing an object image into nine areas, and the image pickup operations are performed in the same manner as described above.

On the other hand, when it is detected that the size of an object is as small as a namecard (90 mm (length)×55 mm (width)), the divisional photographing operation is not performed but an image signal obtained by picking up the entire object image is recorded in the memory card 36. When the object size is as small as the namecard size, and the object image cannot fall within the image pickup field angle range even by setting the lens at the wide-angle end since the object is too close to the camera, a warning tone is generated by a tone generator (not shown).

A method of obtaining the object size in the electronic camera of this embodiment will be described in detail below. When an image of an object having a certain size is to be picked up, the focal length, f, of the photographing lens constituted by the zoom lens 22 and the focus lens 23 obtained when the lens can pick up the entire object image, is equivalent to a view angle θ of the object. That is, the focal length f has negative correlation with the angle θ. If the angle θ and the object distance d are detected, the object size can be determined. Therefore, the electronic camera of this embodiment can obtain the object size on the basis of the object distance d and the focal length f of the photographing lens constituted by the zoom lens 22 and the focal length 23, which focal length is equivalent to the view angle θ of the object. In the electronic camera of this embodiment, a value k obtained by dividing the object distance d by the focal length f is used as an evaluation value that represents the object size, and the object size is determined based on the evaluation value k. The evaluation value k increases as the object size becomes larger, and decreases as the object size becomes smaller In the electronic camera of this embodiment, when the evaluation value k is equal to or smaller than 30 (k≦30), the number of divisions is set to be 1; when the evaluation value k is larger than 30 and is equal to or smaller than 70 (30<k≦70), the number of divisions is set to be 1; and when the evaluation value k exceeds 70 (70<k), the number of divisions is set to be 9. The reason why the number of divisions is set to be the square of a natural number is that the image pickup area can be naturally covered by dividing an image into areas each having a shape similar to that of the image pickup area (3:4 in the NTSC method). However, the number of divided images can be arbitrarily set in correspondence with the size or density of an object.

When the mercury switch 38 detects that the electronic camera main body 1 is not in the horizontal state, the electronic camera of this embodiment is not set in the divisional image pickup mode. In this case, the camera picks up an image as four-divided images with respect to the field angle determined by the photographer, and synthesizes these images by the same method as in the divisional image pickup mode to obtain a high-quality image.

In this embodiment, the VAP 20 bends the optical axis of light rays imaged on the image pickup surface of the CCD image sensor 25. Alternatively, a mechanism for shifting the zoom lens 22 and the focus lens 23 may be arranged, and the tilt angles of these lenses 22 and 23 may be changed in correspondence with the motion vector detected by the motion vector detection circuit 37 so as to shift the optical axis of light rays imaged on the image pickup surface of the CCD image sensor 25. In this case, since the optical axis is not bent inside the VAP 20 but is shifted, the picked-up image is free from any distortion, and the detection precision of correlation among a plurality of divided images can be improved.

In this embodiment, the object distance d is detected based on the position of the focus lens 23 in an in-focus state, but may be detected using a triangulation type distance sensor. In this case, although the cost rises slightly, even the object distance d of an object which is difficult to be set in an in-focus state can be detected.

As described above, according to the electronic camera of this embodiment, since the number of images to be extracted from the object image can be determined on the basis of the size of an object in question, even when an inexpensive CCD image sensor 25 with a smaller number of pixels is used, a stable high-quality still image can be picked up in correspondence with an object.

The second embodiment of the present invention will be described below. In the electronic camera of this embodiment, the focus detection circuit 35 and the system control circuit 30 constitute an object information detection means, and the system control circuit 30 constitutes an image extraction number determination means. Note that the arrangement of the electronic camera of this embodiment is the same as that of the first embodiment, and its illustration will be omitted.

This embodiment is substantially the same as the first embodiment, except that the image pickup operation is performed in the high-image quality mode independently of the object size when an object image has a high density, and a plurality of images extracted from the object image not by the image division method but by a pixel shift method are input. The reason why the image pickup operation is performed in the high-image quality mode when the object image has a high density is that a large object size does not always require an image pickup operation in the high-image quality mode, and contrary to this, a small object size does not always require an image pickup operation in the high-image quality mode. In the pixel shift method, a plurality of images are extracted from the object image by performing image pickup operations every time the optical axis of light rays imaged on the image pickup surface of the CCD image sensor 25 shifts in units of a small number of pixels in the horizontal and vertical directions, and the extracted images are synthesized. In this embodiment, since the image pickup operation is performed in the high-image quality mode in correspondence with the density of the object image, no mercury switch 38 is required to detect the horizontal state of the camera main body 1.

The image pickup operation in the high-image quality mode of the electronic camera of this embodiment will be described below. A photographer selects the recording state using the switch 6, and selects the high-image quality mode using the switch 5. With this operation, letters "high image quality" are displayed on the lowermost portion of the display unit 3 to be superimposed on the image signal In the high-image quality mode, the focus evaluation value of the focus lens 23 is obtained by the focus detection circuit 35 in the same process as in the first embodiment described above. Since this focus evaluation value corresponds to an integrated value, in units of fields, of high-frequency components of the luminance signals of focus areas, when a high-density object image having many edge portions of images such as a document on which many fine characters are written, a figure on which fine patterns are drawn, or the like is picked up, the focus evaluation value in an in-focus state assumes a large value. In this embodiment, in consideration of this point, the pixel shift amount is determined by the pixel shift method and an image pickup operation is performed.

Figure 4:
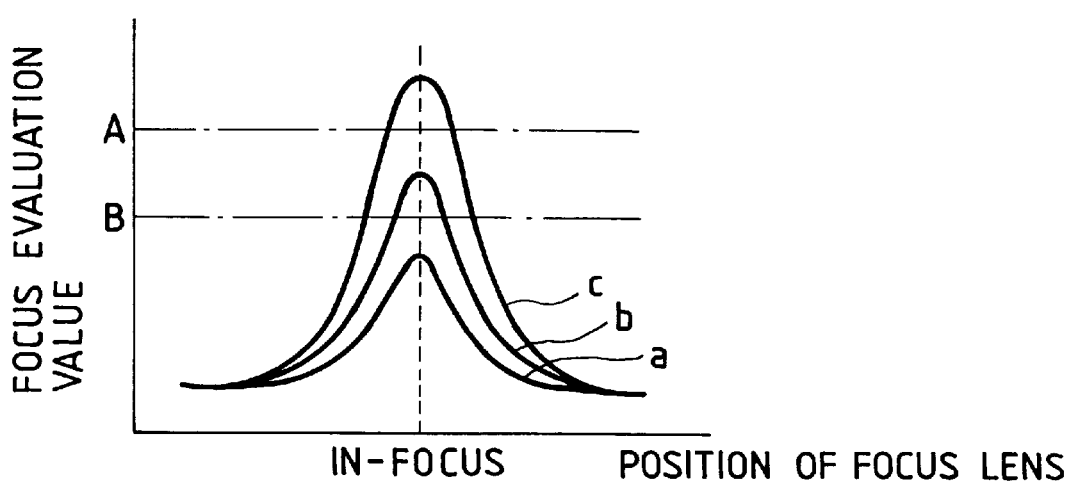
FIG. 4 is a view for explaining a method of determining the pixel shift amount in a pixel shift method according to the second embodiment of the present invention.

FIG. 4 is a graph showing a variation in focus evaluation value upon movement of the focus lens 23. Referring to FIG. 4, A and B represent threshold values used for determining the pixel shift amount in the pixel shift method. For example, when the focus evaluation value obtained upon picking up a certain object image changes like a curve a in correspondence with the position of the focus lens 23, the peak value of the focus evaluation value in an in-focus state does not exceed the threshold value B. For this reason, the image pickup operation is not performed in the high-image quality mode based on the pixel shift method, and an image signal obtained by picking up the entire object image in a single image pickup operation is recorded in the memory card 36.

On the other hand, when the focus evaluation value obtained upon picking up a certain object image changes like a curve b in correspondence with the position of the focus lens 23, the peak value of the focus evaluation value in an in-focus state is located between the threshold values A and B. For this reason, a total of four image pickup operations are performed every time the optical axis of light rays imaged on the image pickup surface of the CCD image sensor 25 is shifted by a 0.5-pixel pitch in the horizontal and vertical directions by controlling the VAP 20 on the basis of the output from the motion vector detection circuit 37, thereby obtaining four images For example, image pickup operations of four images are executed in the order of an image at an origin with pixel shifts in neither the horizontal nor vertical directions, an image at a position shifted by a 0.5-pixel pitch in only the horizontal direction, an image at a position shifted by a 0.5-pixel pitch in both the horizontal and vertical directions, and an image at a position shifted by a 0.5-pixel pitch in only the vertical direction. After the four picked-up images are temporarily recorded in the memory card 36, these four images are synthesized on the image memory 40 by re-arranging pixels on the basis of the pixel shift amount (in this case, a 0.5-pixel pitch), and image data of a single high-quality image obtained by the above-mentioned operation is recorded in the memory card 36. At this time, the initially recorded four image data are erased. The image obtained in this manner has high image quality nearly equivalent to that obtained using a CCD with pixels four times those of the CCD image sensor 25 although the number of pixels of the CCD image sensor 25 is not increased.

When the focus evaluation value obtained upon picking up a certain object image changes like a curve c in correspondence with the position of the focus lens 23, the peak value of the focus evaluation value in an in-focus state exceeds the threshold value A. For this reason, a total of nine image pickup operations are performed every time the optical axis of light rays imaged on the image pickup surface of the CCD image sensor 25 is shifted by a 0.33-pixel pitch in the horizontal and vertical directions by controlling the VAP 20 on the basis of the output from the motion vector detection circuit 37, thereby obtaining nine images. Image data of a single high-quality image obtained by synthesizing the nine picked-up images is recorded in the memory card 36. The image obtained in this manner has high image quality roughly equivalent to that obtained using a CCD with pixels nine times those of the CCD image sensor 25.

In the first embodiment, the number of images to be extracted from the object image is determined on the basis of the object size, and in the second embodiment, the number of images to be extracted from the object image is determined on the basis of the density of the object image. Alternatively, the number of images to be extracted from the object image may be determined on the basis of information as a combination of the size and density of the object. In this case, the number of images to be extracted from the object image can be more adequately determined. On the other hand, the threshold values for the focus evaluation value described above with reference to FIG. 4 may be used for determining the number of division in the image division method.

The third embodiment of the present invention will be described below. In the electronic camera of this embodiment, the zoom driving circuit and the system control circuit 30 constitute an object information detection means, and the system control circuit 30 constitutes an image extraction number determination means. Note that the arrangement of the electronic camera of this embodiment is the same as that of the first embodiment, and its illustration will be omitted.

In the electronic camera of this embodiment, the pixel shift amount in the pixel shift method is determined depending on the zoom position of the zoom lens 22 so as to perform an image pickup operation. For example, assume that the zoom lens 22 is a ×12 zoom lens, and the focal length of the zoom lens 22 can vary within the range from 5 mm to 60 mm. At this time, when the focal length of the zoom lens 22 falls within the range from 5 mm to 10 mm (×12 to ×6 zoom positions), image pickup operations of nine images based on the pixel shift method (shift amount=0.33-pixel pitch) are performed; when the focal length falls within the range from 10 mm to 30 mm (×6 to ×2 zoom positions), image pickup operations of four images based on the pixel shift method (shift amount=0.5-pixel pitch) are performed; and when the focal length falls within the range from 30 mm to 60 mm (×2 to ×1 zoom positions), a normal image pickup operation is performed without using the pixel shift method. In this manner, since the pixel shift amount in the image pickup operation in the high-image quality mode can be determined by only the focal length of the zoom lens 22, the electronic camera can be constituted by a simple circuit. Note that the image division method may also be applied to the electronic camera of this embodiment.

As described above, according to the present invention, since the number of images to be extracted from the object image can be determined on the basis of information associated with each different object, even when an inexpensive image pickup element with a smaller number of pixels is used, a stable, high-quality still image can be picked up in correspondence with the object image.

Many widely different embodiments of the present invention may be constructed without departing from the spirit and scope of the present invention. It should be understood that the present invention is not limited to the specific embodiments described in the specification, except as defined in the appended claims.

What is claimed is:

1. An image pickup apparatus comprising:
   image pickup means for converting an object image formed on an image pickup surface to an image signal;
   object information detection means for detecting information associated with the object; and control means for determining a dividing number of areas into which the object image to be picked up by said image pickup means is to be divided on the basis of the information from said object information detection means and controlling said image pickup means to perform the image pickup operation of the object image by executing image pickup operations a number of times, the number of times being equal to the dividing number.

2. An apparatus according to claim 1, wherein said object information detection means detects at least one of a size and a density of the object.

3. An apparatus according to claim 2, wherein said image pickup means is operable to extract and input a plurality of images from the object by dividing an image of the object in an arbitrary first direction and in at least one other direction perpendicular to the first direction.

4. An apparatus according to claim 3, wherein the image of the object is divided so that each of divided areas partially overlaps neighboring areas.

5. An apparatus according to claim 2, wherein said image pickup means is operable to extract and input a plurality of images from the object by shifting an optical axis of light rays from the object in units of a small number of pixels in an arbitrary first direction and in at least one other direction perpendicular to the first direction.

6. An apparatus according to claim 2, wherein said object information detection means detects the size of the object on the basis of a distance to the object and a focal length of the imaging lens.

7. An apparatus according to claim 6, wherein said image pickup means is operable to extract and input a plurality of images from the object by dividing an image of the object in an arbitrary first direction and in at least one other direction perpendicular to the first direction.

8. An apparatus according to claim 7, wherein the image of the object is divided so that each of divided areas partially overlaps neighboring areas.

9. An apparatus according to claim 6, wherein said image pickup means is operable to extract and input a plurality of images from the object by shifting an optical axis of light rays from the object in units of a small number of pixels in an arbitrary first direction and in at least one other direction perpendicular to the first direction.

10. An apparatus according to claim 2, wherein said object information detection means detects the density of the object on the basis of an image pickup signal output from the image pickup element.

11. An apparatus according to claim 10, wherein said image pickup means is operable to extract and input a plurality of images from the object by dividing an image of the object in an arbitrary first direction and in at least one other direction perpendicular to the first direction.

12. An apparatus according to claim 11, wherein the image of the object is divided so that each of divided areas partially overlaps neighboring areas.

13. An apparatus according to claim 10, wherein said image pickup means is operable to extract and input a plurality of images from the object by shifting an optical axis of light rays form the object in units of a small number of pixels in an arbitrary first direction and in at least one other direction perpendicular to the first direction.

14. An apparatus according to claim 1, wherein said imaging lens has a zoom lens, and said object information detection means detects a focal length of the zoom lens in an in-focus state.

15. An apparatus according to claim 14, wherein said image pickup means is operable to extract and input a plurality of images from the object by dividing an image of the object in an arbitrary first direction and in at least one other direction perpendicular to the first direction.

16. An apparatus according to claim 15, wherein the image of the object is divided so that each of divided areas partially overlaps neighboring areas.

17. An apparatus according to claim 14, wherein said image pickup means is operable to extract and input a plurality of images from the object by shifting an optical axis of light rays from the object in units of a small number of pixels in an arbitrary first direction and in at least one other direction perpendicular to the first direction.

18. An apparatus according to claim 1, wherein said image pickup means is operable to extract and input a plurality of images from the object by dividing an image of the object in an arbitrary first direction and in at least one other direction perpendicular to the first direction.

19. An apparatus according to claim 18, wherein the image of the object is divided so that each of divided areas partially overlaps neighboring areas.

20. An apparatus according to claim 1, wherein said image pickup means is operable to extract and input a plurality of images from the object by shifting an optical axis of light rays from the object in units of a small number of pixels in an arbitrary first direction and in at least one other direction perpendicular to the first direction.

21. An image pickup apparatus comprising:

(a) image pickup means; and (b) control means for determining a dividing number of areas into which an object image is to be divided on the basis of a condition of the object image and for performing an image pickup operation of the object image by executing image pickup operations by said image pickup means a number of times, the number of times being equal to the dividing number, and synthesizing image signals corresponding to the image pickup operations.

* * * * *

UNITED STATES PATENT AND TRADEMARK OFFICE
CERTIFICATE OF CORRECTION

PATENT NO.    : 5,907,353
DATED         : May 25, 1999
INVENTOR(S)   : SHIGEKI OKAUCHI

It is certified that error appears in the above-identified patent and that said Letters Patent is hereby corrected as shown below:

On the title page, item:

[56] REFERENCES CITED

FOREIGN PATENT DOCUMENTS

"06078189" should read --6-078189--
and "08214197" should read --8-214197--.

AT [57] ABSTRACT

Line 5, "for" should be deleted.

COLUMN 1

Line 22, "therein" should read --therein.--;
Line 24, "side" should read --side.--; and
Line 32, "proposed" should read --proposed.--.

COLUMN 3

Line 18, "camera" should read --camera.--; and
Line 63, "embodiment" should read --embodiment.--.

COLUMN 4

Line 10, "result" should read --result.--; and
Line 60, "prevention" should read --prevention.--.

UNITED STATES PATENT AND TRADEMARK OFFICE
CERTIFICATE OF CORRECTION

PATENT NO. : 5,907,353
DATED : May 25, 1999
INVENTOR(S) : SHIGEKI OKAUCHI

It is certified that error appears in the above-identified patent and that said Letters Patent is hereby corrected as shown below:

COLUMN 5

Line 33, "mechanism" should read --mechanism.--.

COLUMN 6

Line 28, "40." should read --40. ¶--;
    Line 36, "performed" should read --performed.--; and
    Line 46, "data" (second occurrence) should read --data.--.

COLUMN 7

Line 38, "smaller" should read --smaller.--.

COLUMN 8

Line 59, "signal" should read --signal.--.

COLUMN 9

Line 31, "images" should read --images.--.

COLUMN 10

Line 66, "and" should read --and ¶--.

UNITED STATES PATENT AND TRADEMARK OFFICE
CERTIFICATE OF CORRECTION

PATENT NO. : 5,907,353
DATED : May 25, 1999
INVENTOR(S) : SHIGEKI OKAUCHI

It is certified that error appears in the above-identified patent and that said Letters Patent is hereby corrected as shown below:

COLUMN 12

Line 4, "form" should read --from--.

Signed and Sealed this

Eighteenth Day of April, 2000

Attest:

Q. TODD DICKINSON

Attesting Officer    Director of Patents and Trademarks